United States Patent [19]
Chang

[11] Patent Number: 5,952,396
[45] Date of Patent: Sep. 14, 1999

[54] LOW MODULUS ELASTOMER

[75] Inventor: Rong Jong Chang, Fremont, Calif.

[73] Assignee: Raychem Corporation, Menlo Park, Calif.

[21] Appl. No.: 08/876,270

[22] Filed: Jun. 16, 1997

[51] Int. Cl.$^6$ .................................. C08F 2/46; C08F 8/00
[52] U.S. Cl. .............................. 522/1; 525/193; 525/211; 525/237; 525/240; 525/289; 525/313; 524/483; 524/490; 522/114; 526/335; 526/337; 526/339; 526/348; 526/348.6
[58] Field of Search ..................................... 525/193, 211, 525/237, 240, 289, 313; 524/483, 490; 522/114, 1; 526/335, 337, 339, 348, 348.6

[56] References Cited

U.S. PATENT DOCUMENTS

| | | | |
|---|---|---|---|
| 3,676,387 | 7/1972 | Lindlof | 260/28.5 B |
| 3,827,999 | 8/1974 | Crossland | 260/33.6 |
| 3,929,715 | 12/1975 | Nowell et al. | 260/33.6 |
| 4,128,523 | 12/1978 | Britton et al. | 260/33.6 AQ |
| 4,348,459 | 9/1982 | Drzal et al. | 428/379 |
| 4,369,284 | 1/1983 | Chen | 524/476 |
| 4,536,445 | 8/1985 | Toy | 428/349 |
| 4,716,183 | 12/1987 | Gamarra et al. | 522/80 |
| 4,721,832 | 1/1988 | Toy | 174/87 |
| 4,868,967 | 9/1989 | Holt et al. | 29/450 |
| 4,915,990 | 4/1990 | Chang | 428/34.9 |
| 4,942,270 | 7/1990 | Gamarra | 174/93 |
| 4,960,829 | 10/1990 | Allen et al. | 525/193 |
| 4,963,698 | 10/1990 | Chang et al. | 174/77 R |
| 5,098,752 | 3/1992 | Chang et al. | 428/34.9 |
| 5,632,122 | 5/1997 | Spinks | 52/172 |

FOREIGN PATENT DOCUMENTS

| | | |
|---|---|---|
| 0174165 A1 | 3/1986 | European Pat. Off. . |
| 0672737 | 9/1995 | European Pat. Off. . |
| 0678959 A1 | 10/1995 | European Pat. Off. . |
| WO 86/01634 | 3/1986 | WIPO . |
| WO 94/18273 | 8/1994 | WIPO . |

OTHER PUBLICATIONS

ASTM D412–92.
Scientific American May 1997, pp. 86–91.
Morton (ed.), Rubber Technology, 2nd Ed., pp. 121–125 (Van Nostrand 1973) IEEE Std 404–1986.
PCT Search Report mailed Oct. 6, 1998.

*Primary Examiner*—Samuel Acquah
*Attorney, Agent, or Firm*—Herbert G. Burkard; Yuan Chao

[57] ABSTRACT

An elastomer has a modulus intermediate between that of a conventional rubber and a gel. The elastomer includes (a) between 20 and 45 parts by weight of a semicrystalline elastomer having between 1 and 15% crystallinity and (b) between 80 and 55 parts by weight of a compatible liquid elastomer having a number-average molecular weight of between 1,500 and 8,500. The elastomer's modulus is sufficiently high to enable it to be fabricated into handleable articles, but is sufficiently low so that it provides effective sealing of substrates it covers without the need for introducing a separate sealing material such as a mastic or adhesive.

8 Claims, No Drawings

LOW MODULUS ELASTOMER

BACKGROUND OF THE INVENTION

This invention relates to low modulus elastomers suitable for use as insulating and sealing materials in electrical products.

Elastomeric materials are available with a wide range of secant moduli (also referred to as $M_{100}$ because it is measured at 100% elongation). At the high end are conventional rubbers, which have moduli in excess of 80 psi. At the low end are gels, sometimes referred to as gelatinous elastomers, having moduli below 2 psi.

A rubber can be the primary insulation in electrical equipment, but its relatively high modulus renders it insufficiently conformable to act as a water sealant, especially where equipment being insulated has a complex topography. To provide sealing, a sealant such as a mastic or adhesive may be interposed between the rubber primary insulation and the underlying equipment. To insulate electrical cable joints, terminations, and like equipment, a rubber can be fabricated as a heat-shrinkable article which is positioned over the equipment and then shrunk by heating, to provide a snug fit (albeit not necessarily water-tight fit in the absence of a sealant). Two disadvantages of a heat-shrinkable article are the need during manufacture for an expansion step and the need for the application of heat during the shrinking step. The expansion step introduces additional cost to the manufacturing process and the range-taking capability of a heat-shrinkable article is limited by the extent of expansion. The application of heat is undesirable as requiring an additional heating tool and as being inconvenient or hazardous at certain installation sites (cramped quarters, possible presence of flammable gases, etc.).

An alternative design employs a fairly high modulus rubber which is held out in an expanded shape by an underlying rigid hold-out element, typically having a spiral shape. After sliding the rubber over the area to be protected, the hold-out is pulled out, permitting the rubber to recover. Disadvantages of this design include the high modulus of the rubber and the possibility of tangling of the hold-out element during its pull-out.

Yet another design is a pre-molded splice case, in which molded insulation closely conforming to the dimensions of the equipment to be protected is slid over (with the aid of a lubricant if needed) over the equipment. Because of the rigidity of the molded material, this design has limited range-taking capability and may be difficult to install.

Conversely, a gel is highly conformable and possess good tackiness, making it an effective sealant. However, its low modulus precludes its use as a primary insulation. Generally, it is contained within an article (such as a connector), which provides structural support. Most gels are highly filled with a low molecular weight extending oil, which is can diffuse into a substrate with which it is in contact over time during service if a critical pressure is exceeded. Such exudation is undesirable. It is common in high voltage cable joints and terminations to have a semiconductive material ("semicon") present, to provide electrical stress grading. The exuded oil may migrate into the semicon or the cable jacket, adversely affecting their electrical properties or swelling them.

BRIEF SUMMARY OF THE INVENTION

The present invention provides an elastomer having a modulus spanning those of rubbers and gels, enabling the elastomer to provide superior sealing compared to a rubber, but yet having sufficiently higher modulus than a gel so that it does not require a containing vessel. The elastomer is devoid of a oil extender which can exude during service. The elastomer can be stretched easily during installation to facilitate range-taking, but maintains its elasticity during service and has good dielectric properties for use as an insulator.

Accordingly, there is provided a composition comprising:
  (a) between 20 and 45 parts by weight of a semicrystalline elastomer having between 1 and 15% crystallinity and
  (b) between 80 and 55 parts by weight of a compatible liquid elastomer having a number-average molecular weight ($M_n$) of between 1,500 and 8,500.

Preferably, the composition is crosslinked, for example by irradiation with an electron beam.

DETAILED DESCRIPTION OF THE INVENTION

The compositions of this invention preferably have a secant modulus or $M_{100}$ of between 2 and 80 psi, preferably between 10 and 50 psi, and most preferably between 10 and 40 psi. $M_{100}$ is a measurement of the tensile strength of a composition at 100% elongation, measured at room temperature (about 23° C.) and a stretch rate of 2 in/min, according to ASTM D412-92 (1992).

The semicrystalline elastomer can be an ethylene-propylene-diene terpolymer (a type of EPDM, e.g., Vistalon 5600 or 7000 from Exxon or Royalene 539 from Uniroyal or a metallocene polymer (e.g., Engage 8150 and 8200 from Dow or Exact 5008 from Exxon). The term "metallocene polymer" is generally used to describe copolymers of ethylene and alpha-olefins using metallocene-type catalysts. For example, Engage is a copolymer of ethylene and 1-octene made by Dow's Insite™ technology (also called constrained geometry catalyst) while Exact is a copolymer of ethylene and 1-butene made by Exxon's metallocene catalyst system. More information on metallocene catalysts and polymers made using them may be found in Ewen, *Scientific American*, pp. 86–91 (May 1997).

The crystallinity of the semicrystalline elastomer provides dimensional stability in a finished article. (Strictly speaking, all polymers are at most only semicrystalline because no polymer is 100% crystalline. However, the term "semicrystalline" is associated with polymers having a reduced level of crystallinity, e.g., 1–15%, as compared to conventional crystalline polymers (e.g., high density polyethylene, crystallinity 60–80%).) When referring to the crystallinity level of the semicrystalline elastomer, its crystallinity (1 to 15%) before compounding into the composition of this invention is meant. After compounding, the crystallinity is depressed (usually to about 1 to 5%) by the presence of the liquid elastomer component. Further, the crystallinity improves the processability and handleability of the uncrosslinked material by providing a limited amount of self-supporting strength, making it possible to extrude or mold it. An uncrosslinked sample of a composition according to this invention is gel-like or gum-like in nature, whereas a corresponding material wherein the semicrystalline elastomer has been replaced with a non-crystalline polymer resembles a mastic.

The compatible liquid elastomer (also called a liquid rubber) can be selected from the group consisting of ethylene-propylene-diene-monomer ("EPDM") rubber, ethylene-propylene ("EP") rubber, and butyl rubber. Specific examples of suitable liquid elastomers include liquid EPDM's such as Trilene 65 and CP20 (Uniroyal Chemical) and Vistanex LM (Exxon Chemical). It is to be understood that the term "liquid elastomer" does not literally mean that the material has elastomeric properties while in the liquid form, but that it is a liquid (usually viscous) which can be formulated into a material which is elastomeric after crosslinking.

An important characteristic of a composition of this invention is that, when crosslinked, it has a low tension set (tensile set), meaning that after being stretched for a period of time and then allowed to retract, the composition recovers back towards its original dimension. A low tension set corresponds to a high degree of recovery. Preferably, the tension set of compositions of this invention is 11% or less. Tension set can be measured by ASTM D412-92 (1992).

The compositions of this invention can be crosslinked by gamma or electron beam radiation. The efficiency of radiation crosslinking may be increased by adding an effective amount of a prorad in intimate mixture with the polymeric components. Generally, a prorad is a compound having at least two ethylenic double bonds, present as allyl, methallyl, propargyl, acrylyl, or vinyl groups. Examples of suitable prorads include triallyl cyanurate (TAC), triallyl isocyanurate (TAIC), triallyl trimellitate, triallyl trimesate, tetraallyl pyromellitate, the diallyl ester of 1,1,3-trimethyl-5-carboxy-3-(p-carboxyphenyl)indane, diallyl adipate, diallyl phthalate (DAP), diallyl isophthalate, diallyl terephthalate, 1,4-butylene glycol dimethacrylate, trimethylolpropane trimethacrylate (TMPTM), pentaerythritol trimethacrylate, glycerol propoxy trimethacrylate, liquid poly(1,2-butadiene), tri-(2-acryloxyethyl)isocyanurate, and tri-(2-methacryloxyethyl)isocyanurate, and the like, and combinations thereof. Preferred crosslinking agents are TAIC, TAC, and TMPTM. Other crosslinking agents which can be used are disclosed in U.S. Pat. Nos. 3,763,222; 3,840,619; 3,894,118; 3,911,192; 3,970,770; 3,985,716; 3,995,091; 4,031,167; 4,155,823; and 4,353,961, the disclosures of which are incorporated herein by reference. Mixtures of crosslinking promoters can be used. Preferably, the radiation crosslinking promoter is used in an amount of between 0.1% and 10%, more preferably between 1% and 5%, per cent by weight based on the weight of the composition.

Compositions of this invention can also be crosslinked by conventional chemical means, for example with peroxides.

Whether radiation or chemically crosslinked, the elastomers retain good elongation, typically of over 400%.

A composition of this invention may further contain other additives commonly used in polymer formulations, such as antioxidants, UV stabilizers, fillers, and colorants, in typical amounts.

In a typical compounding procedure, a Brabender or sigma-blade mixer is set at 80° C. The semicrystalline polymer, plus antioxidant, colorants, and fillers, if any, are added. Mixing is continued until the polymer is melted and the mixture is homogeneous. The liquid elastomer is added gradually and portion-wise, and mixing is further continued until homogeneity is achieved. For example, a quarter of the total liquid rubber is added at a time, mixed until the liquid elastomer is fully incorporated into the mixture. Then, the next quarter of the liquid rubber is added and the procedure is repeated until all the liquid rubber has been added and incorporated. Prorad is added and mixing continued until homogeneous.

To measure tensile strength and elongation, the procedure of ASTM D412 was generally followed and is summarized as follows: an Instron Model 5567 tensile tester driven by Merlin/Series IX software was set up with a 225 lb Tension Load Cell. The jaw separation was 50.8 mm (2 in). The crosshead speed was 2.0 in/min. These adjustments were made using Windows-based Merlin Series IX software. The extension return limit was set at 763 mm. Test specimens were cut from slabs 0.020 to 0.030 inch thick with a dumbbell-shaped D-die per ASTM specifications with a reduced section dimension of 0.125 inch. The Instron tester was calibrated using the built-in calibration capability. Measurements were done at ambient (room) temperature (20–25° C.). Each test specimen was measured for width and thickness before analysis, using a micrometer. Two bench marks were marked on each specimen with a 1.0 inch (25.4 mm) separation, centered on the reduced section, in order to measure elongation. The specimens were stretched until break at a crosshead speed of 2 in/min. The elongation between the benchmarks was measured with a video extensometer. The tensile strength, elongation and secant modulus were all recorded automatically using the Merlin software. "Elongation" means the elongation at break, also referred to as the ultimate elongation. Similarly, "tensile strength" means the tensile strength at break, also referred to as the ultimate tensile strength, and is calculated by dividing the tension at break by the initial cross-sectional area. $M_{100}$ (secant) modulus was calculated as follows: the load at 100% strain was determined. This load was divided by the original cross-sectional area to obtain the tensile stress, in pounds/square inch (psi).

Table I illustrates the properties of compositions of this invention obtained when 100 part by weight of the semicrystalline polymer is compounded with 200 parts by weight of two liquid elastomers (Trilene 65 and Trilene CP20, in 1:1 weight ratio). In addition to the two polymeric components, each formulation contained 0.63% stabilizers, 1.25% colorant, and 3.16% prorad, based on the total weight of the formulation. The compositions were crosslinked with electron beam radiation with the dosages indicated.

TABLE I

| | Semicrystalline Polymer | | | |
|---|---|---|---|---|
| Property | Exact 5008 | Engage 8150 | Engage 8200 | Vistalon 5600 |
| Polymer Type | Metallocene | Metallocene | Metallocene | EPDM |
| Crystallinity (%) | 2.55 | 9.96 | 8.03 | 2.8 |
| Melting point (°C.) | 47.9 | 57.5 | 64.6 | 17 to 49 |
| Beam Dose (MRad) | 10 | 10 | 10 | 10 |
| $M_{100}$ (psi) | 16 | 83 | 2297 | 653 |
| Elongation (%) | 2006 | 1946 | 2297 | 653 |
| Tensile Strength (psi) | 38 | 246 | 154 | 99 |
| Tension Set (%)[a] | 10 | 10 | 11 | 7 |
| Oil Exudation | None seen | None seen | None seen | None seen |

[a]At 23° C. after stretching for 1 hr and relaxing for 10 min.

Table II provides comparative examples in which the semicrystalline polymer is replaced by other polymers not according to this invention. Otherwise, the formulations in Table II are identical to those of Table I.

TABLE II

(Comparative)

| | Semicrystalline Polymer Replaced With | | | | |
|---|---|---|---|---|---|
| Property | Alathon 7030 | Petrothen NA226 | Flexomer GERS108 | Exact 4033 | Vistalon 4608 |
| Polymer Type | HDPE | LDPE | VLDPE | Metallocene | Amorphous EPDM |
| Crystallinity (%) | 65.3 | 39.6 | 16.2 | 16.5 | 0 |
| Melting point (°C.) | 135 | 108 | 117 | 64 | — |
| Beam Dose (MRad) | — | 25 | 10 | 10 | 10 |
| $M_{100}$ (psi) | — | 45 | 35 | 51 | 22 |
| Elongation (%) | — | 126 | 105 | 436 | 1,943 |
| Tensile St. (psi) | — | 48 | 49 | 107 | 161 |
| Tension Set (%)[a] | — | — | — | 28 | 15 |
| Oil Exudation[b] | Oily | Oil exuded | Oil exuded | None seen | None seen |

[a]At 23° C. after stretching for 1 hr and relaxing for 10 min.
[b]"Oily" means the liquid elastomer was not entirely incorporated into the micture; "oil exuded" means the liquid elastomer was fully incorporated initially, but upon contact with a substrate (e.g., release paper), an oily residue was left on the substrate.

The results of Tables I and II show that the compositions according to the invention have high elongation after crosslinking, a low tension set, and do not exude oil. In contrast, if the semicrystalline elastomer is replaced with a polymer having a degree of crystallinity higher than prescribed by this invention (Alathon 7030 (Du Pont), Petrothen NA226 (Quantum Chemical), Flexomer GERS108 (Union Carbide), or Exact 4033 (Exxon Chemical)), the resulting composition either exudes oil (evidencing incompatibility) or has an undesirable high tension set. Or, if the semicrystalline elastomer is replaced with a non-crystalline (amorphous) polymer (Vistalon 4608), the resulting composition is mastic-like (very tacky) has an undesirable high tension set.

The oil exudation characteristics of the composition of this invention were compared against those of conventional materials in other ways. When compressed against a porous porcelain plate for 1 month at 5 psi, a composition according to this invention had only 4–5 weight % oil exudation (based on weight of starting material), while a conventional silicone gel and a conventional triblock copolymer gel showed exudation at the 38 and 50 weight % levels, respectively.

The effect of exudation on semicon material can be demonstrated by the following experiment, in which an EPDM-based elastomer according to this invention is compared against a butyl based gel according to U.S. Pat. No. 5,177,143. Table III tabulates the volume resistivity of semicon material after specified days of exposure to either the elastomer or the

TABLE III

| | Volume Resistivity of Semicon (ohm-cm) | |
|---|---|---|
| Days | Butyl Gel (Comparative) | EPDM Elastomer (This Invention) |
| 0 | $0.01 \times 10^4$ | $0.01 \times 10^4$ |
| 1 | $1.50 \times 10^4$ | $0.13 \times 10^4$ |
| 2 | $7.0 \times 10^4$ | $0.13 \times 10^4$ |
| 4 | $8.0 \times 10^4$ | $0.13 \times 10^4$ |
| 10 | $10.0 \times 10^4$ | $0.13 \times 10^4$ |
| 15 | — | $0.13 \times 10^4$ |
| 28 | — | $0.14 \times 10^4$ |
| 42 | — | $0.14 \times 10^4$ |

According to the IEEE Task Group 10-48, the resistivity of the semicon should be less than $5.0 \times 10^4$ ohm-cm after 42 days contact at 90° C. As can be seen from Table III, the butyl gel exceeds the recommended limit within two days, while the low modulus elastomer of this invention does not even approach the limit after the full 42 day test period.

The compositions of this invention can be formed into a variety of articles for use in the electrical industry. Their modulus is low enough that a tube therefrom can be stretched manually, allowing installation over a cable joint or termination by a "push-on" technique instead of heat-shrinking. Further, these tube can be coextruded with a semicon material as the exterior material. Alternatively, compositions can be used to make wrap-around articles. Molded parts can also be fabricated from them. The sealing effectiveness of the composition of this invention is demonstrated by the fact that an extruded tube made from it passed the IEEE Std-404 (1986) underwater load cycling test at 130° C.

The foregoing detailed description of the invention includes passages which are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various descriptions herein may relate to specific embodiments of the invention, it is to be understood that where a specific feature is disclosed in the context of a particular embodiment, such feature can also be used, to the extent appropriate, in the context of another embodiment, in combination with another feature, or in the invention in general.

Further, while the present invention has been particularly described in terms of certain preferred embodiments, the invention is not limited to such preferred embodiments. Rather, the scope of the invention is defined by the appended claims.

What is claimed is:

1. A composition, comprising
   (a) between 20 and 45 parts by weight of a semicrystalline elastomer having between 1 and 15% crystallinity and
   (b) between 80 and 55 parts by weight of a compatible liquid elastomer having a number-average molecular weight of between 1,500 and 8,500.

2. A composition according to claim 1, wherein the semicrystalline elastomer is selected from the group consisting of semicrystalline EPDM and metallocene ethylene-alpha-olefin copolymers.

3. A composition according to claim 1, wherein the liquid elastomer is selected from the group consisting of ethylene-propylene-diene-monomer rubber, ethylene-propylene rubber, and butyl rubber.

4. A composition according to claim 1, 2, or 3, which has been crosslinked with electron beam radiation or gamma-irradiation.

5. A composition according to claim 4, having a tension set no greater than 11%.

6. A composition according to claim 4, having an $M_{100}$ modulus between 2 and 80 psi.

7. A composition according to claim 4, having an $M_{100}$ modulus between 10 and 50 psi.

8. A composition according to claim 4, having an elongation greater than 400%.

* * * * *